US006640300B1

(12) United States Patent
Raza (10) Patent No.: US 6,640,300 B1
(45) Date of Patent: Oct. 28, 2003

(54) METHOD AND APPARATUS FOR WIDTH AND DEPTH EXPANSION IN A MULTI-QUEUE SYSTEM

(75) Inventor: S. Babar Raza, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/406,667

(22) Filed: Sep. 27, 1999

(51) Int. Cl.[7] ................................................. G06F 9/00
(52) U.S. Cl. ........................... 713/1; 713/100; 711/170; 711/171; 711/172; 711/173
(58) Field of Search ...................... 345/501; 347/129; 358/445; 365/189.01; 710/71, 60; 711/100, 170, 171, 172, 173; 713/1, 100, 500

(56) References Cited

U.S. PATENT DOCUMENTS

| | | | | | |
|---|---|---|---|---|---|
| 4,750,149 A | * | 6/1988 | Miller | ........................... | 710/71 |
| 4,839,866 A | * | 6/1989 | Ward et al. | ............. | 365/189.01 |
| 4,947,267 A | * | 8/1990 | Masaki et al. | .............. | 358/445 |
| 5,036,489 A | * | 7/1991 | Theobald | ..................... | 365/73 |
| 5,262,997 A | * | 11/1993 | Lee | .............................. | 365/221 |
| 5,692,138 A | * | 11/1997 | Fandrich et al. | ............ | 710/305 |
| 5,768,211 A | * | 6/1998 | Jones et al. | .................... | 710/60 |
| 5,778,218 A | * | 7/1998 | Gulick | ......................... | 710/60 |
| 5,801,740 A | * | 9/1998 | Isono et al. | ................. | 347/129 |
| 6,218,702 B1 | * | 4/2001 | Yamazaki et al. | ......... | 257/347 |
| 6,388,777 B1 | * | 5/2002 | Miyajima | ................... | 358/412 |

OTHER PUBLICATIONS

Cypress, "64×8 Cascadable FIFO 64×9 Cascadable FIFO", Cypress Semiconductor Corporation, Jul. 1986—Revised Jul. 1994.*

* cited by examiner

Primary Examiner—Thomas Lee
Assistant Examiner—James K. Trujillo
(74) Attorney, Agent, or Firm—Christopher P. Maiorana, P.C.

(57) ABSTRACT

An apparatus configured to read and write data in a plurality of memories. The plurality of memories may be configured to store and present the data in response to (i) a write data path and (ii) a read data path. One of the plurality of memories may be configured to control the remainder of the plurality of memories in response to one or more write signals and (ii) one or more read signals.

31 Claims, 8 Drawing Sheets

(CONVENTIONAL)

FIG. 1

(CONVENTIONAL)
FIG. 2

METHOD AND APPARATUS FOR WIDTH AND DEPTH EXPANSION IN A MULTI-QUEUE SYSTEM

CROSS REFERENCE TO RELATED APPLICATION

The present application may relate to application Ser. No. 09/406,042, filed Sep. 27, 1999, which is hereby incorporated by reference in its entirety.

FIELD OF THE INVENTION

The present invention relates to multi-queue storage devices generally and, more particularly, to a method and/or architecture of width and depth expansion in a high speed multi queue system.

BACKGROUND OF THE INVENTION

Figure 1:
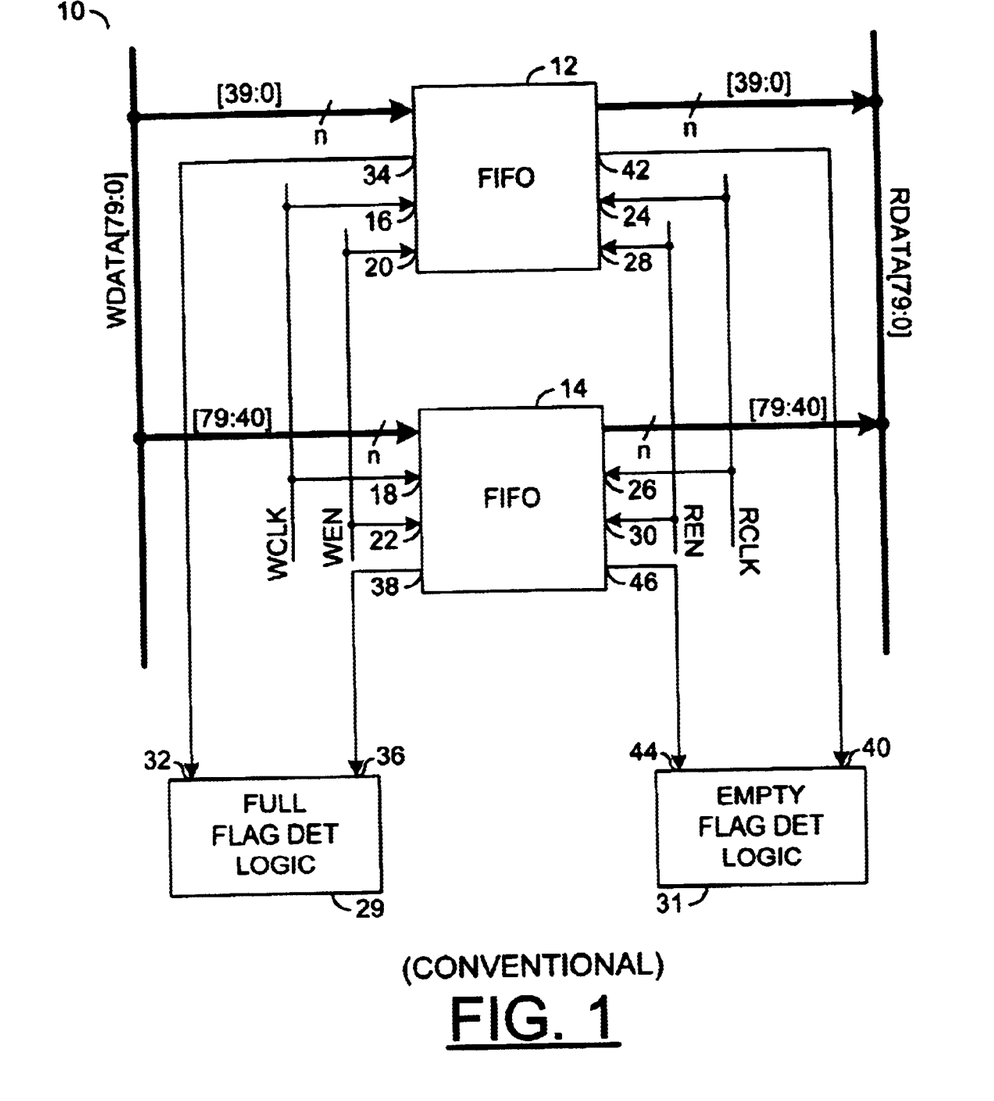
FIG. 1 is a detailed block diagram of a convention circuit for width expansion.

Referring to FIG. 1 a block diagram of a conventional circuit 10 for width expansion of a first-in first-out (FIFO) device is shown. The circuit 10 comprises a FIFO 12, a FIFO 14, a bus WDATA[79:0] and a bus RDATA[79:0]. The 80-bit bus WDATA[79:0] writes data to the FIFOs 12 and 14 through a 40-bit bus [39:0] and a 40-bit bus [79:40]. The 80-bit bus RDATA[79:0] reads the data from the FIFOs 12 and 14 through a 40-bit bus [39:0] and a 40-bit bus [79:40]. The FIFOS 12 and 14 each communicate through the 40-bit data busses [39:0] and [79:0] creating an 80-bit width circuit 10. The bus WDATA[79:0] and the bus RDATA[79:0] create point-to-point connections between (i) the FIFOs 12 and 14 and (ii) various reading and writing devices (not shown).

A write clock signal WCLK is presented to an input 16 of the FIFO 12 and to an input 18 of the FIFO 14. A write enable signal WEN is presented to an input 20 of the FIFO 12 and to an input 22 of the FIFO 14. A read clock signal RCLK is presented to an input 24 of the FIFO 12 and to an input 26 of the FIFO 14. A read enable signal REN is presented to an input 28 of the FIFO 12 and to an input 30 of the FIFO 14. Data is written to the FIFO 12 and/or 14 on a rising edge of the clock signal WRLK when the enable signal WEN is active (or asserted). The data is read from the FIFO 12 and/or 14 on a rising edge of a read clock signal RCLK when the read enable signal REN is active.

The circuit 10 additionally comprises a full flag logic block 29 and an empty flag logic block 31. The full flag logic block 29 generates full flags in response to the fullness of the FIFOs 12 and 14. An output 34 of the FIFO 12 is connected to an input 32 of the full flag logic block 29. An output 38 of the FIFO 14 is connected to an input 36 of the full flag logic block 29. The empty flag logic block 31 generates empty flags in response to the emptiness of the FIFOs 12 and 14. An output 42 of the FIFO 12 is connected to an input 40 of the empty flag logic block 31. An output 46 of the FIFO 14 is connected to an input 44 of the empty flag logic block 31. Logic flags for the circuit 10 are generated in response to the emptiness/fullness of the FIFOs 12 and 14.

The circuit 10 cannot deal with multi-queue configuration, status information, queue selection, queue reset operation and/or multicast/broadcast support functions. As the spread (i.e., the number of FIFOs) of the circuit 10 increases, the write enable signal WEN and the read enable signal REN require point-to-multipoint additional circuitry to avoid bus contention at the read interface.

Figure 2:
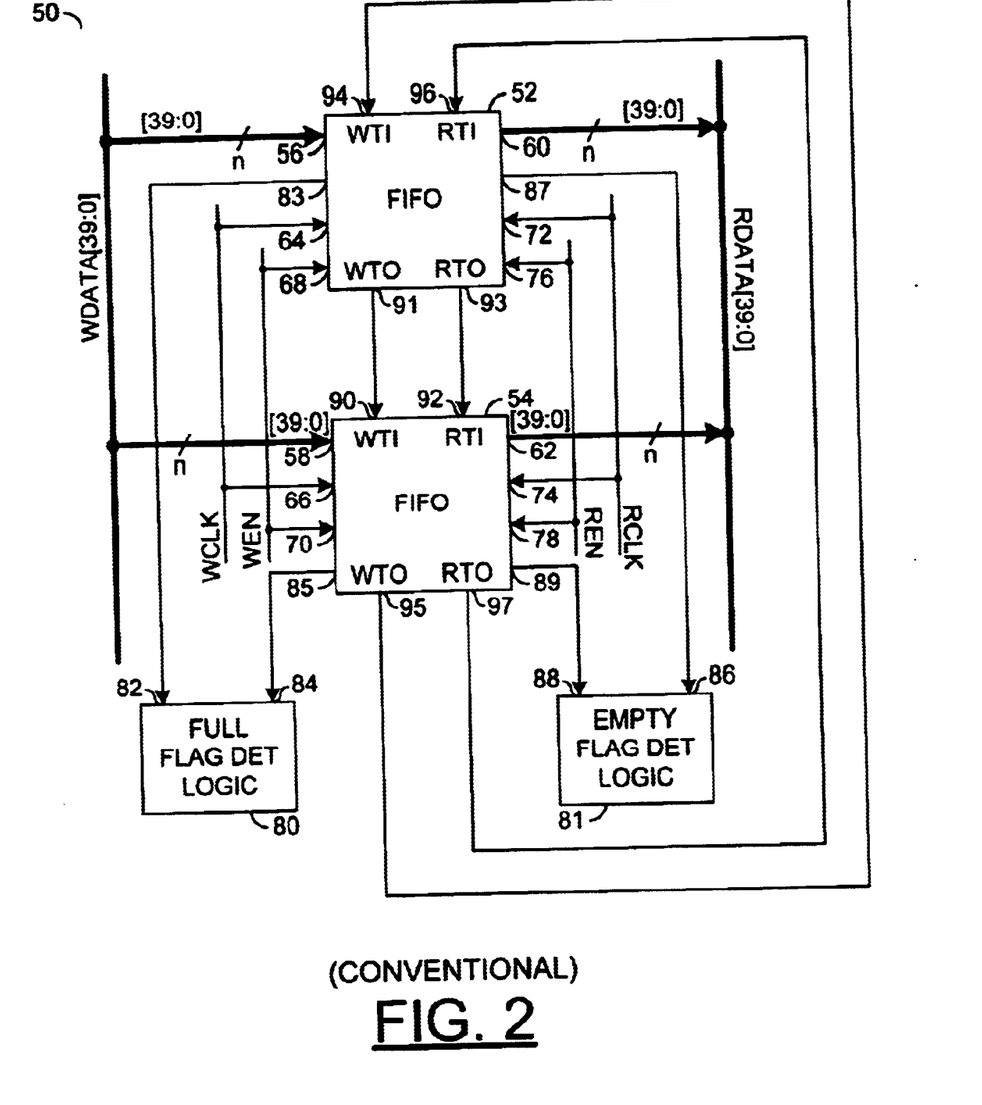
FIG. 2 is a detailed block diagram of a conventional circuit for depth expansion FIG. 3 (a)–(b) are block diagrams illustrating differences between single queue and multi-queue devices.

Referring to FIG. 2 a block diagram of a conventional circuit 50 for depth expansion of FIFOs is shown. The circuit 50 comprises a FIFO 52, a FIFO 54, a bus WDATA[39:0] and a bus RDATA[39:0]. The 40-bit bus WDATA[39:0] is connected to an input 56 of the FIFO 52 and to an input 58 of the FIFO 54. The 40-bit bus RDATA[39:0] is connected to an output 60 of the FIFO 52 and an output 62 of the FIFO 54. The 40-bit bus WDATA[39:0] and the 40-bit bus RDATA[39:0] are each connected in parallel with the FIFOs 52 and 54. The parallel buses WDATA[39:0] and RDATA[39:0] create a FIFO having twice the depth of either the FIFO 52 or 54.

Data is written into the FIFO 52 and/or 54 through the bus WDATA[39:0]. The data is read from the FIFO 52 and/or 54 through the bus RDATA[39:0]. The busses WDATA[39:0] and RDATA[39:0] are point-to-multipoint connections between (i) the FIFOs 52 and 54 and (ii) various reading and writing devices (not shown).

A write clock signal WCLK is presented to an input 64 of the FIFO 52 and to an input 66 of the FIFO 54. A write enable signal WEN is presented to an input 68 of the FIFO 52 and an input 70 of the FIFO 54. A read clock signal RCLK is presented to an input 72 of the FIFO 52 and to an input 74 of the FIFO 54. A read enable signal REN is presented to an input 76 of the FIFO 52 and an input 78 of the FIFO 54. Data is written to the FIFO 52 and/or 54 on a rising edge of the clock signal WRLK when the enable signal WEN is active. The data is read from the FIFO 52 and/or 54 on a rising edge of a read clock signal RCLK when the read enable signal REN is active.

The circuit 50 additionally comprises a full flag logic block 80 and an empty flag logic block 81. The full flag logic block 80 generates full flags in response to the fullness of the FIFOs 52 and 54. An output 83 of the FIFO 52 is connected to an input 82 of the full flag logic block 80. An output 85 of the FIFO 54 is connected to an input 84 of the full flag logic block 80. The empty flag logic block 81 generates empty flags in response to the emptiness of the FIFOs 52 and 54. An output 87 of the FIFO 52 is connected to an input 86 of the empty flag logic block 81. An output 89 of the FIFO 54 is connected to an input 88 of the empty flag logic block 81. Logic flags for the circuit 50 are generated in response to the emptiness/fullness of the FIFOs 52 and 54.

The circuit 50 requires additional circuitry for depth expansion. The FIFOs 52 and 54 are connected in a daisy chain type configuration. A write token pin WTI 90 of the FIFO 54 is connected to a write token pin WTO 91 of the FIFO 52. A read token pin RTI 92 of the FIFO 54 is connected to a read token pin WTO 93 of the FIFO 52. A write token pin WTO 95 of the FIFO 54 is connected to a write token pin WTI 94 of the FIFO 52. A read token pin WTO 97 of the FIFO 54 is connected to a read token pin RTI 96 of the FIFO 52. The write token pins WTI 90, WTO 91, WTI 94 and WTO 95 are used to implement write depth expansion. The read token pins RTI 92, RTO 93, RTI 96 and RTO 97 are used to implement read depth expansion.

The FIFO 52 passes a write token to the pin WTI 90 during a full condition. The write token forces a next data packet to be written in the FIFO 54. The FIFO 54 passes the write token back to the pin 94 of the FIFO 52 during a full condition. In a case where both the FIFOs 52 and 54 are full, the full flag logic block 80 will assert a full flag. The read tokens of the FIFOs 52 and 54 operate similarity to the write tokens and are passed between the two FIFOs 52 and 54.

The circuit 50 cannot implement a delayed queue select write operation. The delay queue select write operation cannot be implemented because each of the FIFOs 52 and 54 need to know a queue address before determining whether the write token is present. In order for delayed queue selection write operation to be implemented, the FIFOs 52 and/or 54 need to store data from the start-of-packet.

The delay queue selection write operation requires a point-to-multipoint data interface. The point-to-multipoint interface requires additional circuitry and in some cases, may even be impossible as the frequency of operation increases. The management interface further requires additional circuitry and in some cases, may even be impossible as the frequency of operation increases.

The delay queue select operation requires additional external logic to determine the flag status of each queue that is presented on the pin. For example, if 16 flags are presented on the pins for full and empty flags simultaneously, 32 external flag detection logic circuits would be required. The delay queue select further requires complicated end of packet (EOP) logic communication between chips. Additionally, the delay queue selection operation requires logic to avoid bus contention at the read interface.

SUMMARY OF THE INVENTION

The present invention concerns an apparatus configured to read and write data in a plurality of memories. The plurality of memories may be configured to store and present the data in response to (i) a write data path and (ii) a read data path. One of the plurality of memories may be configured to control the remainder of the plurality of memories in response to one or more write signals and (ii) one or more read signals.

The objects, features and advantages of the present invention include providing a circuit for multi-queue storage that may implement (i) a width expansion scheme allowing multi-queue configuration, status information, queue selection, queue reset operation and multicast/broadcast support functions, (ii) high speed point-to-multipoint connections, (iii) a delayed queue select write operation, (iv) point-to-multipoint data interfaces that may not have a need for additional circuitry, (v) a flag status scheme that may not require external logic to determine the flag status of each queue that is presented on the pin, (vi) communication between chips that may not require complicated end of packet logic and/or (vii) a read interface that may not require additional logic to avoid bus contention at the read interface.

BRIEF DESCRIPTION OF THE DRAWINGS

These and other objects, features and advantages of the present invention will be apparent from the following detailed description and the pended claims and drawings in which:

DETAILED DESCRIPTION OF THE PREFERRED EMBODIMENTS

Figure 3A:
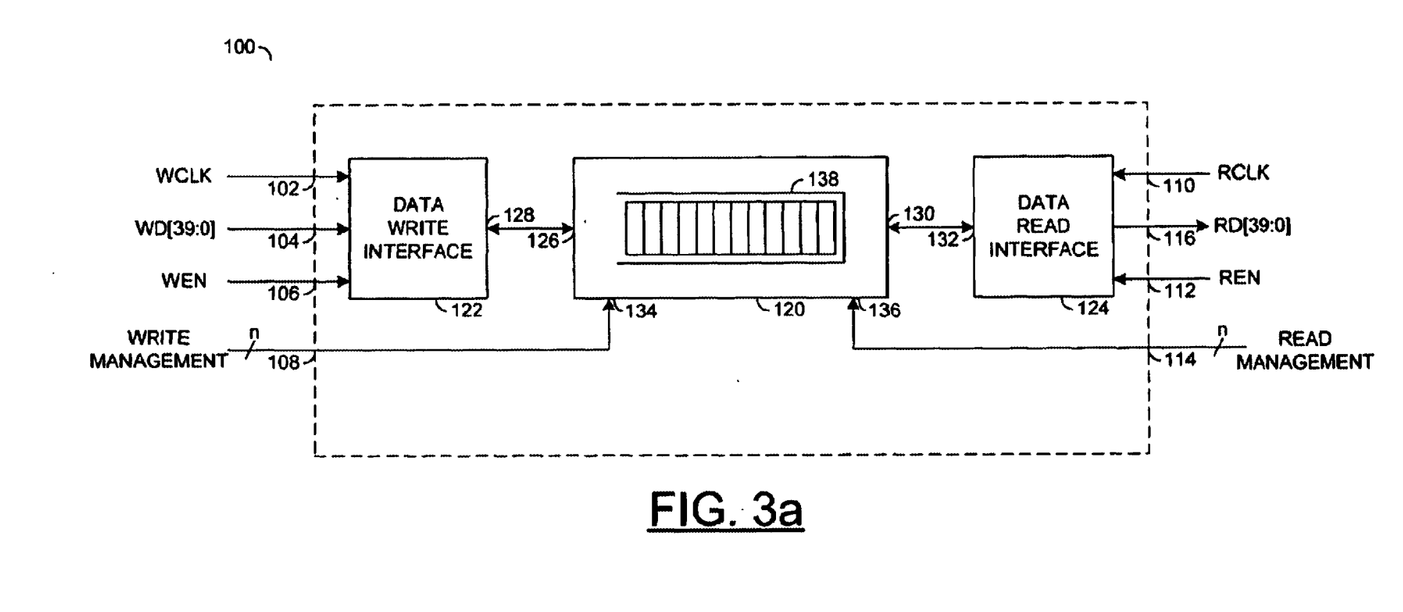

Referring to FIG. 3a, a block diagram of a circuit 100 is shown illustrating a single queue FIFO 100. The FIFO 100 may receive a clock signal (e.g., WCLK) at an input 102, a bus (e.g., WD[39:0]) at an input 104, a signal (e.g., WEN) at an input 106, a clock signal (e.g., RCLK) at an input 110, and a signal (e.g., REN) at an input 112. The FIFO 100 may be connected to an interface (e.g., WRITE MANAGEMENT) at a connection 108 and an interface (e.g., READ MANAGEMENT) at a connection 114. The FIFO 100 may present data to a bus (e.g., RD[39:0]) from an output 116.

The write bus WD[39:0] may write to the FIFO 100 in response to the clock signal WCLK and the enable signal WEN. The read bus RD[39:0] may read from the FIFO 100 in response to the clock signal RCLK and the enable signal REN.

The FIFO 100 may comprise a memory section 120, an interface block (or circuit) 122 and an interface block (or circuit) 124. The interface circuit 122 may be implemented as a write interface circuit and the interface circuit 124 may be implemented as a read interface circuit. The write interface circuit 122 may be bi-directionally connected between a connection 126 of the memory section 120 and a connection 128. The read interface circuit 124 may be bi-directionally connected between a connection 130 of the memory section 120 and a connection 132. The memory section 120 may comprise a queue 138. The FIFO 100 may write information to the queue 138 in response to the clock signal WCLK, the enable signal WEN, the write bus WD[39:0] and the interface WRITE MANAGEMENT. The FIFO 100 may read from the queue 138 in response to the clock signal RCLK, the enable signal REN, the read bus RD[39:0] and the interface READ MANAGEMENT.

Figure 3B:
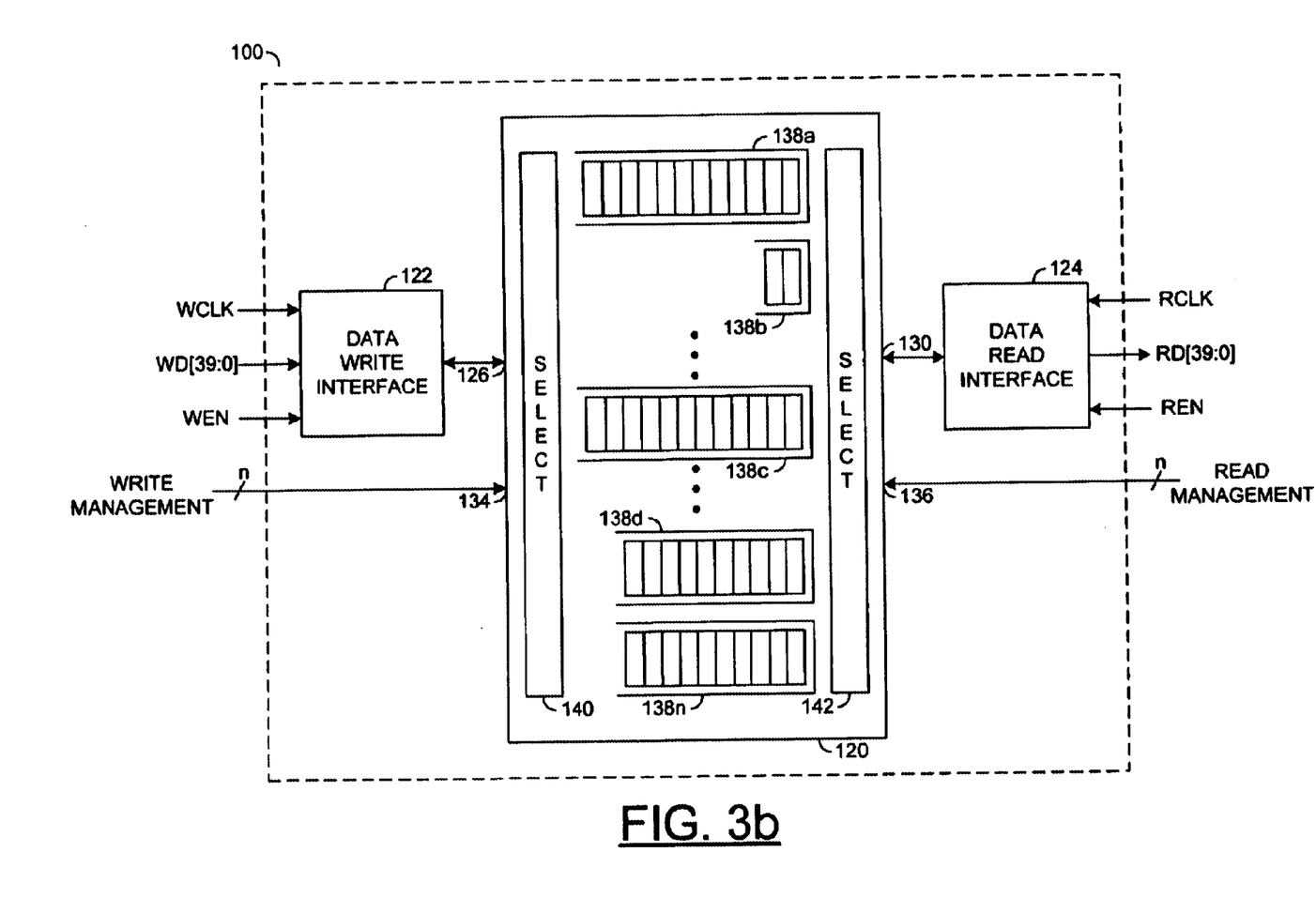

Referring to FIG. 3b an example of a multi-queue circuit 100 is shown. The circuit 100 may be implemented as a multi-queue FIFO. The memory section 120 is generally capable of storing data in independently variable size queues 138a–138n, where N is an integer. In one example, the maximum number of queues may be 64. However, a greater number of queues 138a–138n may be implemented accordingly to meet the design criteria of a particular implementation. Each of the queues 138a–138n may be independently configured from a minimum depth of 0 blocks to the maximum depth of the FIFO 100.

The multi-queue FIFO 100 may write to the queues 138a–138n in response to the clock signal WCLK, the enable signal WEN, the write bus WD[39:0] and the interface WRITE MANAGEMENT. The multi-queue FIFO 100 may read from the queues 138a–138n in response to the clock signal RCLK, the enable signal REN, the read bus RD[39:0] and the interface READ MANAGEMENT. The multi-queue FIFO 100 may be implemented in network switch fabric systems that support quality of service (QoS) or virtual output queuing (VOQ) (to be discussed later in connection with FIG. 4). An example of such a multi-queue FIFO 100 may be found in co-pending application, Ser. No. 09/347,046, which is hereby incorporated by reference in its entirety. The multi-queue FIFO 100 may require additional methods and/or circuitry that may select one of the queues 138a–138n for reading and writing of data. The memory section 120 may additionally comprise a select block (or circuit) 140 and a select block (or circuit) 142. The select blocks 140 and 142 may select a queue 138a–138n to write data to and/or read data from.

The queues 138a–138n may require a read and write management interface (to be discussed later in connection with FIG. 4). Outside multi-queue devices (not shown) may require width expansion of the multi-queue FIFO 100.

Width expansion may require the read and write management interfaces to become point-tomultipoint interfaces. The read and write management interfaces may be required to run at wire speed (e.g., the speed of a data interface). The read and write management interfaces may be required to access flag status data of the queues 138a–138n while performing other real time functions. The flag status for each queue 138a–138n is generally updated once a block is written into or extracted from the particular queue 138a–138n.

Figure 4:
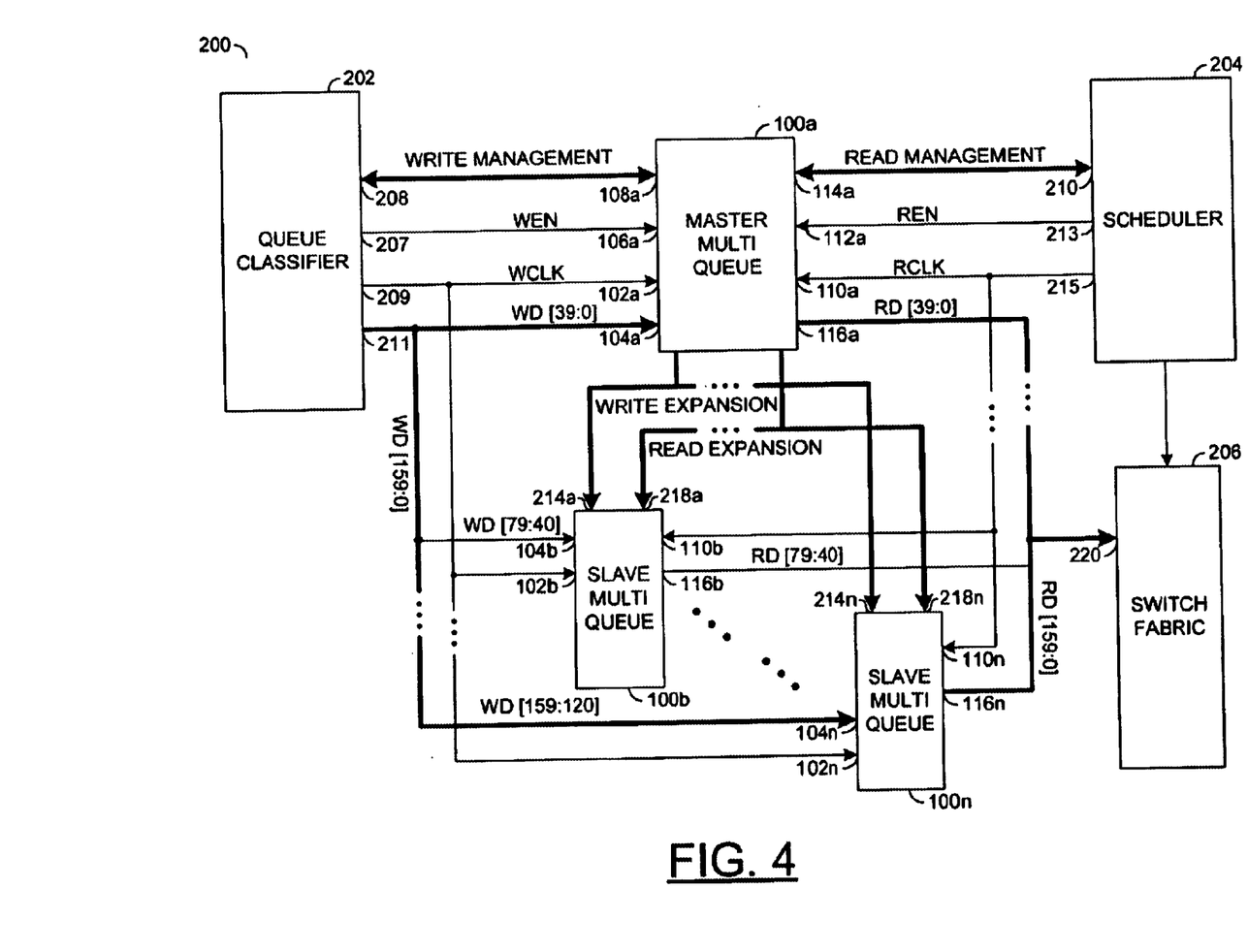
FIG. 4 is a block diagram of a preferred embodiment of the present invention illustrating width expansion.

Referring to FIG. 4, a block diagram of circuit 200 is shown illustrating width expansion in accordance with a preferred embodiment of the present invention. The circuit 200 may implement N number of FIFOs 100, where N is an integer. The FIFOs 100a–100n may be implemented as multi-queue FIFOs. The circuit 200 may comprise a classifier block (or circuit) 202, a scheduler block (or circuit) 204 and a switch fabric block (or circuit) 206. The classifier 202 may be implemented as a queue classifier. In one example, the circuit 200 may implement the FIFO 100a as a master FIFO and the remaining FIFOs 100b–100n as slave FIFOS.

The interface WRITE MANAGEMENT may be connected between the connection 108a of the master FIFO 100a and a connection 208 of the classifier 202. The master FIFO 100a may communicate with the queue classifier 202 through the interface WRITE MANAGEMENT with a point-to-point connection. The interface READ MANAGEMENT may be connected between the connection 114a of the master FIFO 100a and a connection 210 of the scheduler 204. The master FIFO 100a may communicate with the scheduler 204 through the interface READ MANAGEMENT with a point-to-point connection.

The enable signal WEN may be generated at an output 207 of the classifier 202. The enable signal WEN may be presented to the input 106a of the FIFO 100a. The clock signal WCLK may be generated at an output 209 of the classifier 202. The clock signal WCLK may be presented to the inputs 102a–102n of the FIFOs 100a–100n. The enable signal REN may be generated at an output 213 of the scheduler 204. The enable signal REN may be presented to the input 112a of the FIFO 100a. The clock signal RCLK may be generated at a output 215 of the scheduler 204. The clock signal RCLK may be presented to the inputs 110a–110n of the FIFOs 100a–100n.

The circuit 200 may additionally comprise a bus (e.g., WD[159:0]) and a bus (e.g., RD[159:0]). The bus WD[159:0] may be implemented, in one example, as a 160-bit write data bus. The bus RD[159:0] may be implemented, in one example, as a 160-bit read data bus. However, the particular bit-widths of the busses WD[159:0] and RD[159:0] may be adjusted accordingly to meet the criteria of a particular implementation. The 160-bit bus WD[159:0] may communicate between a connection 104a–104n of the FIFOs 100a–100n and a connection 211 of the classifier 202. The FIFOs 100a–100n and the classifier 202 may communicate through the 40-bit busses WD[39:0], WD[79:40], WD[119:80] and WD[159:120] (not all are shown). One of the 40-bit buses WD[39:0], WD[79:40], WD[119:80] and WD[159:120] may be connected to the FIFOs 100a–100n at the connection 104a–104n, respectively. For example, the 40-bit bus WD[39:0] may be connected to the input 104a of the FIFO 100a.

The master FIFO 100a may communicate with the slave FIFOs 100b–100n through an interface (e.g., WRITE EXPANSION) and an interface (e.g., READ EXPANSION). The interface WRITE EXPANSION may be connected between an output 212 of the master FIFO 100a and a number of inputs 214a–214n of the slave FIFOs 100b–100n. The interface READ EXPANSION may be connected between an output 216 of the master FIFO 100a and a number of inputs 218a–218n of the slave FIFOs 100b–100n.

Communication over the interface WRITE MANAGEMENT may be classified into two categories (i) configuration information and (ii) real time information. The classifier 202 may configure the FIFOs 100a–100n by writing configuration information into the master FIFO 100a. The master FIFO 100a may download the configuration information into the slave FIFOs 100b–100n, allowing the FIFOs 100a–100n to be width expanded. The width expanded FIFOs 100a–100n may generate essentially identical status information. The status information may allow for an absence of communication across the interfaces WRITE EXPANSION and READ EXPANSION. The status information may be directly communicated between the master FIFO 100a and the classifier 202 through the interface WRITE MANAGEMENT.

Multicast port information may not have to be communicated to the slave FIFOs 100b–100n. The scheduler 204 generally communicates to the master FIFO 100a through the interface READ MANAGEMENT. The scheduler 204 is generally able to receive the multicast port information from the master FIFO 100a. The master FIFO 100a and the slave FIFOs 100b–100n may communicate through the interfaces WRITE EXPANSION and READ EXPANSION in real time. The information generally communicated between the master FIFO 100a and slave FIFOs 100b–100n is queue selection information, reset information and flush commands for multicast queues.

The 160-bit bus RD[159:0] may communicate between the FIFOs 100a–100n and the switch fabric circuit 206 through the 40-bit busses RD[39:0], RD[79:40], RD[119:80] and RD[159:120] of the FIFOs 100a–100n (not all are shown) . One of the 40-bit busses RD[39:0] , RD[79:40], RD[119:80] and RD[159:120] may be connected to the outputs 116a–116n of the FIFOs 100a–100n, respectively. For example, the 40-bit bus RD[39:0] may be connected from the output 116a of the FIFO 100a.

The FIFOs 100a–100n may be programmable FIFOs with features that require configuration. The FIFOs 100a–100n may require additional methods of selection. The methods of selection may be configured to select a queue of the multiple queues 138a–138n of FIG. 3b to read and/or write data. The queue classifier 202 may control writing to the FIFOs 100a–100n. The scheduler 204 may control reading from the FIFOs 100a–100n.

Figure 5:
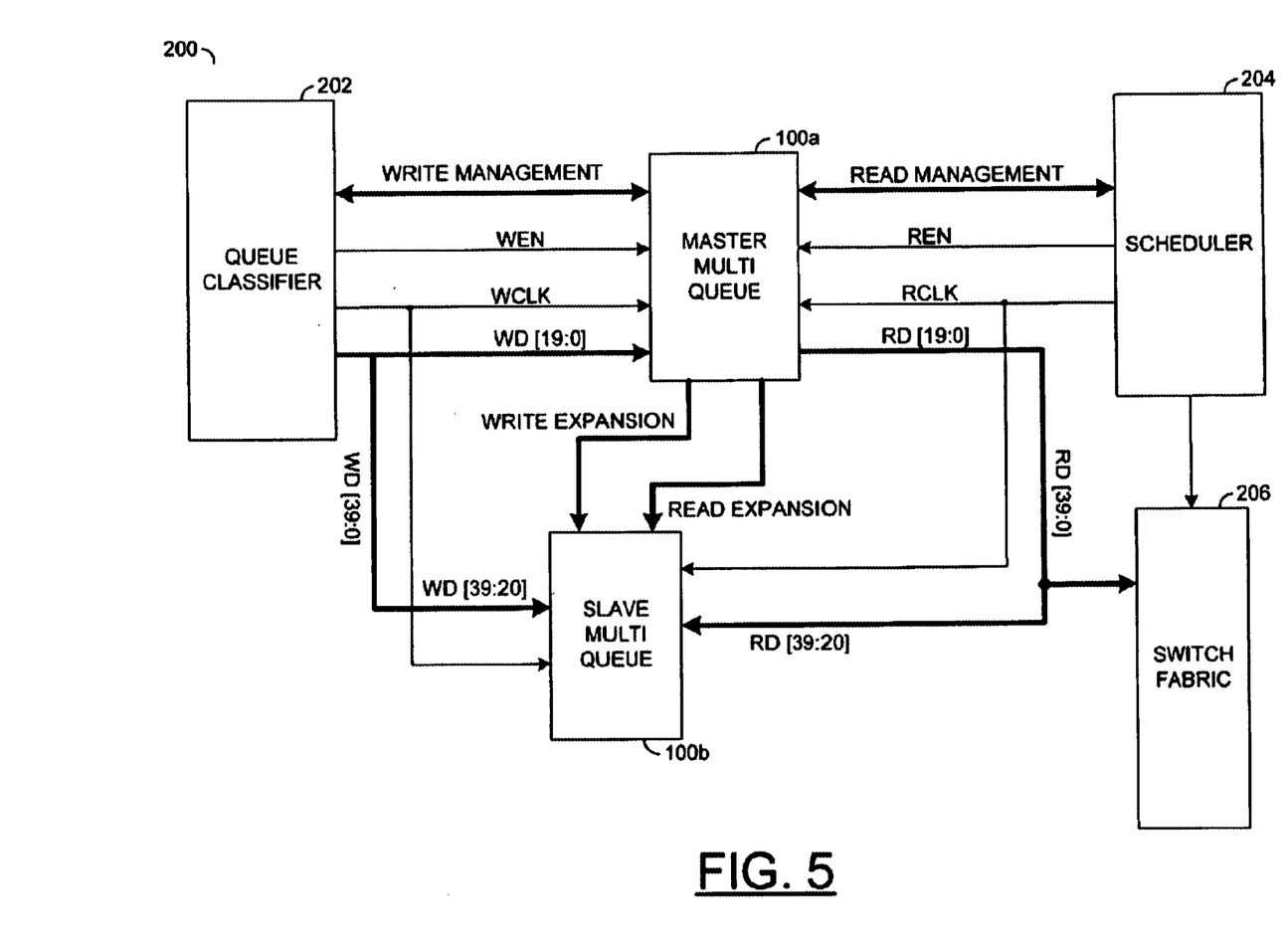
FIG. 5 is a block diagram of the present invention illustrating d expansion.

Referring to FIG. 5, a more detailed block diagram of the circuit 200 is shown illustrating an example of depth expansion. The example of the circuit 200 in FIG. 5 may eliminate the point-to-multipoint connection by implementing a bus (e.g., RD[39:0]) and a bus (e.g., WD[39:0]). The bus RD[39:0] may be implemented, in one example, as a 40-bit read bus. The bus WD[39:0] may be implemented, in one example, as 40-bit write bus.

The circuit 200 may implement depth expansion by implementing a special case of width expansion with bus matching. The circuit 200 may be implemented, in one example, as a 40-bit wide multi-queue circuit. The circuit 200 may be implemented as a device twice as deep as the FIFO 100a. The circuit 200 is generally configured by bus matching, enabling only half of the input interface of the circuit 200. In such an implementation, half a word is generally written to each of the FIFOs 100a–100b.

The circuit 200 may allow point-to-point data interface of the same width, but with double depth. The classifier 202 and scheduler 204 may control reading and writing of the circuit 200. The classifier 202 and scheduler 204 may operate similar to point-to-point width expansion.

Figure 6:
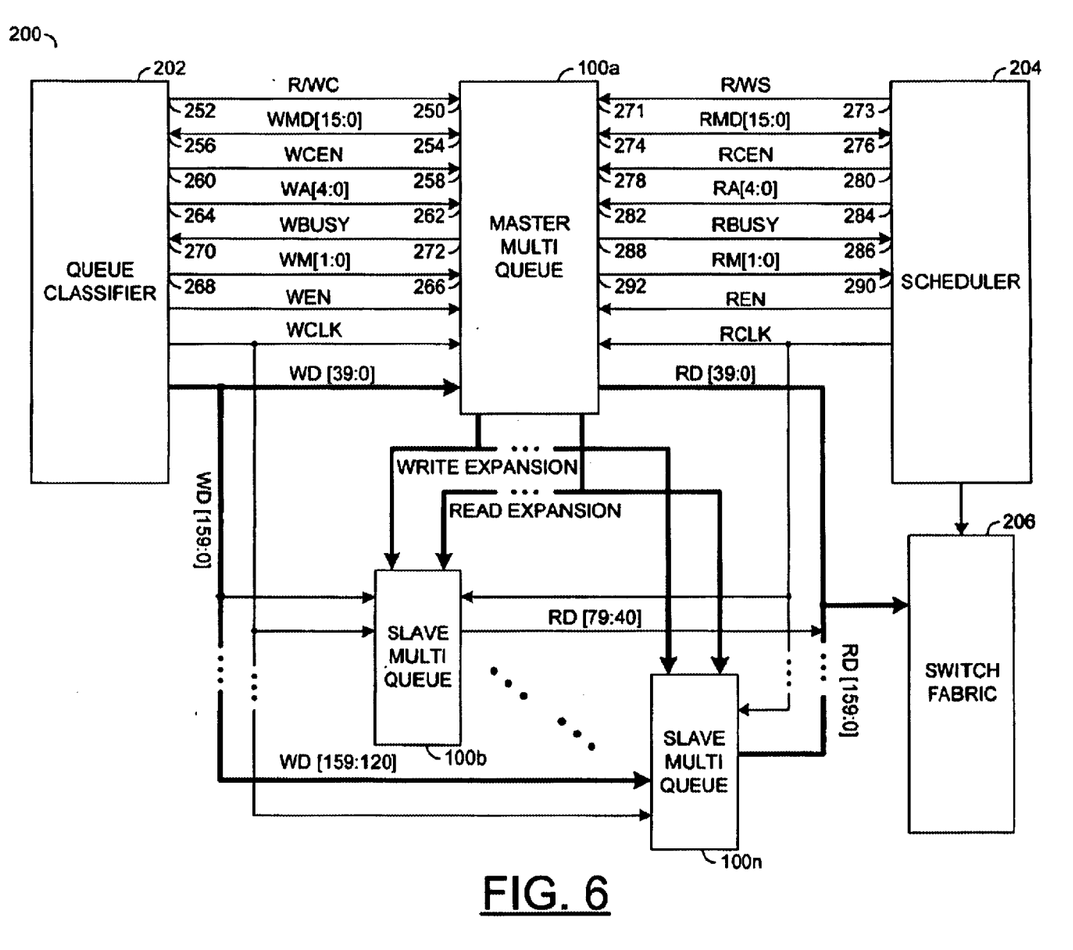
FIG. 6 is a lock diagram illustrating an example of the management interfaces.

Referring to FIG. 6, a block diagram of the circuit 200 illustrating an example of the management interfaces. The circuit 200 may be a detailed example of the interfaces WRITE MANAGEMENT and READ MANAGEMENT.

An output 252 of the classifier 202 may present a signal (e.g., R/WC) to an input 250 of the master FIFO 100a. A connection 256 of the classifier 202 may be connected through an interface (e.g., WMD[15:0]) to a connection 254 of the FIFO 100a. An output 260 of the classifier 202' may present a clock signal (e.g., WCEN) to an input 258 of the FIFO 100a. An output 264 of the classifier 202 may be connected though an interface (e.g., WA[4:0]) to an input 262 of the FIFO 100a. A connection 268 of the classifier 202 may be connected through an interface (e.g., WM[1:0]) to a connection 266 of the FIFO 100a. An output 272 of the master FIFO 100a may present a signal (e.g., WBUSY) to an input 270 of the classifier 202. The particular polarities (e.g., active high or active low) and the bit-width of the signals R/WC, WMD[15:0], WCEN, WAC[4:0], WM[1:0] and WBUSY may be adjusted accordingly in order to meet the criteria of a particular implementation. The signals R/WC, WMD[15:0], WCEN, WAC[4:0], WM[1:0] and WBUSY may be management interface signals that may be used to write to and/or read from the circuit 200.

An output 273 of the scheduler 204 may present a signal (e.g., R/WS) to an input 271 of the master FIFO 100a. A connection 276 of the scheduler 204 may be connected through an interface (e.g., RMD[15:0]) to a connection 274 of the FIFO 100a. An output 280 of the scheduler 204 may present a clock signal (e.g., RCEN) to an input 278 of the FIFO 100a. An output 284 of the scheduler 204 may be connected though an interface (e.g., RA[4:0]) to an input 282 of the FIFO 100a. An output 288 of the master FIFO 100a may present a signal (e.g., RBUSY) to an input 286 of the scheduler 204. A connection of the master FIFO 100a may be connected through an interface (e.g., RM[1:0]) to a connection 290 of the FIFO 100a. The particular polarities (e.g., active high or active low) and the bit-width of the signals R/WS, RMD[15:0], RCEN, RA[4:0], RBUSY and RM[1:0] may be adjusted accordingly in order to meet the criteria of a particular implementation. The signals R/WS, RMD[15:0], RCEN, RA[4:0], RBUSY and RM[1:0] may be management interface signals that may be used to write to and/or read from the circuit 200.

The interfaces WMD[15:0] and RMD[15:0] may be implemented as write data interfaces, read data interfaces or any other type appropriate interface to meet the criteria of a particular implementation. The interfaces WM[1:0] and RM[1:0] may carry end-of-packet (EOP), start-of-packet (SOP) or any other tag information necessary to meet the design criteria of a particular implementation. The signal WBUSY and the signal RBUSY may be implemented to communicate to external devices connected to the circuit 200 that the operations on the current queue are in progress and the status or stats information may not be current.

Figure 7:
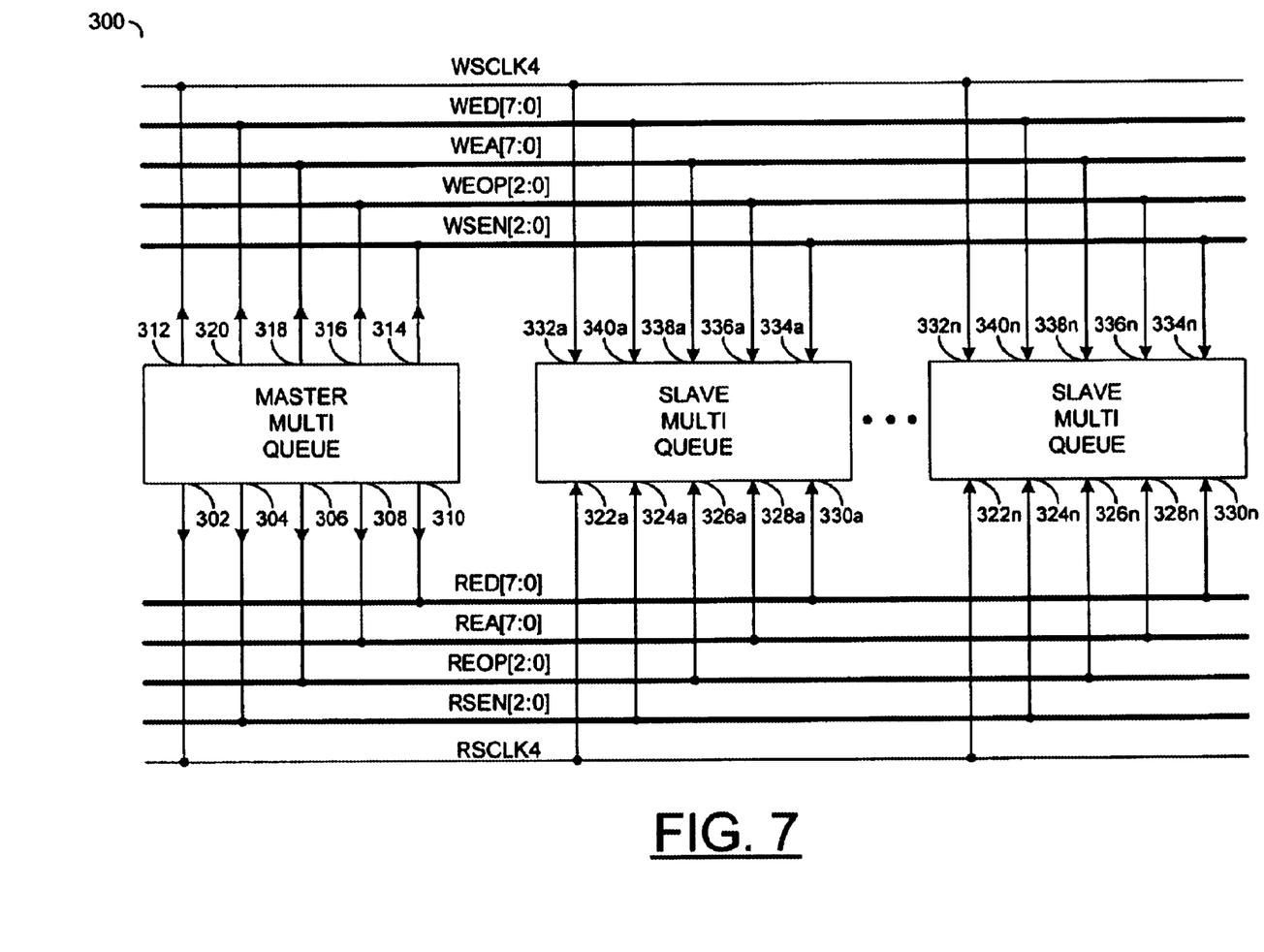
FIG. 7 is a block diagram of an example of an expansion interface.

Referring to FIG. 7, a block diagram of a circuit 300 is shown illustrating an example of an expansion interface. The circuit 300 may implement N number of the FIFOs 100, where N is an integer. The FIFOs 100 may be implemented as multi-queue FIFOS. In one example, the circuit 300 may implement the FIFO 100a as a master FIFO and the remaining FIFOs 100b–100n as slave FIFOs.

The master FIFO 100a may present a clock signal (e.g., RSCLK4) at an output 302, an enable signal (e.g., RSEN [2:0]) at an output 304, a signal (e.g., REOP[2:0]) at an output 306, a signal (e.g., REA[7:0]) at an output 308 and a signal (e.g., RED[7:0]) at an output 310.

The master FIFO 100a may present a clock signal (e.g., WSCLK4) at an output 312, an enable signal (e.g., WSEN [2:0]) at an output 314, a signal (e.g., WEOP[2:0]) at an output 316, a signal (e.g., WEA[7:0]) at an output 318 and a signal (e.g., WED[7:0]) at an output 320.

The slave FIFOs 100b–100n may each receive the clock signal RSCLK4 at an input 322a–322n, the enable signal RSEN[2:0] at an input 324a–324n, the signal REOP[2:0] at an input 326a–326n, the signal REA[7:0] at an input 328a–328n and the enable signal RED[7:0] at an input 330a–330n.

The slave FIFOs 100b–100n may each additionally receive the clock signal WSCLK4 at an input 332a–332n, the enable signal WSEN[2:0] at an input 34a–334n, the signal WEOP[2:0] at an input 336a–336n, the signal WEA [7:0] at an input 338a–338n and the enable signal WED[7:0] at an input 340a–340n.

The master FIFO 100a may generate data on the expansion data busses WED[7:0] and RED[7:0]. The signal WEA [7:0] and the signal RED[7:0] may determine whether the data on the data bus is queue select information or queue reset information. The clock signal WSCLK4 and RSCLK4 may be implemented as expansion clocks. The expansion clocks WSCLK4 and RSCLK4 may synchronize the queue select information or the queue reset information from the master FIFO 100a to the slave FIFOS 100b–100n. The clocks WSCLK4 and RSCLK4 may be implemented as having, in one example, a frequency equal to one quarter of the management interface frequency. The signals WEOP [2:0] and REOP[2:0] may comprise end-of-packet information and enable signals for configuration of the slave FIFOS 100b–100n. The signals WEOP[2:0] and REOP[2:0] may toggle at the same frequency as the management interface, but are generally provided as point-to-point connections for the slave FIFOs 100b–100n. The signals WEOP[2:0] and REOP[2:0] may eliminate a need for any external logic for signals.

While the invention has been particularly shown and described with reference to the preferred embodiments thereof, it will be understood by those skilled in the art that various changes in form and details may be made without departing from the spirit and scope of the invention.

What is claimed is:

1. An apparatus configured to read and write data comprising:
   a first memory configured to store and present said data at a speed of an external device (i) from a write data path and (ii) to a read data path; and
   one or more second memories configured to store and present said data at said speed of said external device (i) from said write data path and (ii) to said read data path, wherein said first memory is configured to receive control information from said write data path and said read data path and control said one or more second memories via a plurality of write expansion signals and a plurality of read expansion signals in response to (i) one or more write signals and (ii) one or more read signals.

2. The apparatus according to claim 1, wherein said one or more second memories are configured to provide width expansion in response to one or more width control signals.

3. The apparatus according to claim 1, wherein said one or more second memories are configured to provide depth expansion with bus matching in response to one or more depth control signals.

4. The apparatus according to claim 1, wherein:
said first memory is further configured to receive a first and a second enable signal from said write data path and said read data path; and
said one or more second memories are configured to receive a third and a fourth enable signal as part of said plurality of write expansion signals and said plurality of read expansion signals.

5. The apparatus according to claim 4, wherein said first and third enable signals each comprise a write enable signal and said second and fourth enable signals each comprise a read enable signal.

6. The apparatus according to claim 4, wherein said first and second memories are further configured to receive a first and a second clock signal from said write data path and said read data path.

7. The apparatus according to claim 6, wherein said first clock signal comprises a write clock signal and said second clock signal comprises a read clock signal.

8. The apparatus according to claim 6, further comprising a classifier circuit configured to present said first enable signal and said first clock signal via said write data path.

9. The apparatus according to claim 6, further comprising a scheduler circuit configured to present said second enable signal and said second clock signal via said read data path.

10. The apparatus according to claim 1, wherein each of said first and second memories are configured to store said data to a plurality of queues and present said data from said plurality of queues.

11. The apparatus according to claim 10, wherein each of said first and second memories further comprise one or more select circuits configured to select one or more of said plurality of queues to store and present said data.

12. The apparatus according to claim 11, wherein each of said first and second memories comprises a first and a second data interface configured to write to and read from said plurality of queues.

13. The apparatus according to claim 1, further comprising:
a write management interface configured to communicate queue select information, queue statistics information and configuration information to said first memory;
a write data interface configured to write data to said first and second memories;
a write expansion interface configured to receive said queue select information, queue statistics information and configuration information;
a read management interface configured to communicate queue select information, queue statistics information and configuration information to said first memory;
a read data interface configured to read data from said first and second memories; and
a read expansion interface configured to receive said queue select information, queue statistics information and configuration information.

14. The apparatus according to claim 13, wherein:
said write data interface is configured to write in response to a first clock signal and a first enable signal; and
said read data interface is configured to read in response to a second clock signal and a second enable signal.

15. The apparatus according to claim 11, wherein said one or more select circuits are further configured to select said one or more queues in response to (i) said one or more read signals and (ii) said one or more write signals.

16. The apparatus according to claim 9, further comprising a switch fabric circuit configured to present said data in response to one or more signals from said read data path of said scheduler.

17. An apparatus configured to read and write data comprising:
means for storing and presenting said data in response to (i) a write data path and (ii) a read data path comprising a first memory and one or more second memories, wherein said first memory is configured to control said one or more second memories via a plurality of expansion signals in response to one or more write signals and (ii) one or more read signals;
means for controlling a width of said storing and presenting means; and
means for controlling a depth of said storing and presenting means.

18. A method for reading and writing data comprising the steps of:
(A) storing said data to and presenting said data from a first memory in response to (i) a write management interface and (ii) a read management interface and storing said data to and presenting said data from one or more second memories in response to (i) a write expansion interface and (ii) a read expansion interface; and
(B) controlling a width and depth of one or more queues in said first and second memories in response to one or more configuration signals.

19. The method according to claim 18, wherein each of said first and second memories is further configured to receive (i) a first and a second enable signal and (ii) a first and a second clock signal.

20. The method according to claim 19, further comprising the step of:
(A) generating said first enable signal, said first clock signal and said write management interface with a classifier; and
(B) generating said second enable signal, said second clock signal and said read management interface with a scheduler.

21. The apparatus according to claim 1, wherein each of said first memory and said one or more second memories comprises a multi-queue FIFO.

22. The apparatus according to claim 1, wherein:
said first memory is configured as a master device; and
each of said one or more second memories is configured as a slave device.

23. The apparatus according to claim 1, wherein said control information comprises one or more management interface signals.

24. The apparatus according to claim 1, further comprising:
a write management interface configured to communicate queue select information, queue statistics information and configuration information to said first memory, wherein said write management interface communicates at a first wire speed on a point-to-point interface.

25. The apparatus according to claim 24, further comprising:
a write data interface configured to write data to said first and second memories, wherein said write data interface communicates at said first wire speed on a point-to-point interface.

26. The apparatus according to claim 24, further comprising:
a write expansion interface configured to receive said queue select information, queue statistics information and configuration information, wherein said write expansion interface communicates at a second wire speed as a point-to-multipoint interface.

27. The apparatus according to claim 1, further comprising:
a read management interface configured to communicate queue select information, queue statistics information and configuration information to said first memory, wherein said read management interface communicates at a first wire speed as a point-to-point interface.

28. The apparatus according to claim 27, further comprising:
a read data interface configured to read data from said first and second memories, wherein said read data interface communicates at said first wire speed as a point-to-point interface.

29. The apparatus according to claim 27, further comprising:
a read expansion interface configured to receive said queue select information, queue statistics information and configuration information, wherein said read expansion interface communicates at a second wire speed with said memory as a point-to-multipoint interface.

30. The apparatus according to claim 13, wherein:
said write management interface, said write data interface, said read management interface and said read data interface communicate at a first wire speed; and said write expansion interface and said read expansion interface communicate at a second wire speed.

31. The apparatus according to claim 13, wherein:
said write management interface, said write data interface, said read management interface and said read data interface communicate on point-to-point interfaces; and
said write expansion interface and said read expansion interface communicate on point-to-multipoint interfaces.

* * * * *